United States Patent [19]

Kwon et al.

[11] Patent Number: 4,980,182
[45] Date of Patent: Dec. 25, 1990

[54] BEVERAGES CONTAINING A BEVERAGE BASE AND MILK PROTEIN

[75] Inventors: Steven S. Kwon, New Milford, Conn.; Jeffrey H. Main, North Salem, N.Y.; Constance L. Smith, New Milford, Conn.

[73] Assignee: Nestec S.A., Vevey, Switzerland

[21] Appl. No.: 369,188

[22] Filed: Jun. 21, 1989

[51] Int. Cl.$^5$ ............................................. A23C 11/02
[52] U.S. Cl. .................................. 426/130; 426/271; 426/594; 426/597; 426/580
[58] Field of Search ............... 426/433, 594, 597, 575, 426/613, 130, 580, 271, 435

[56] References Cited

U.S. PATENT DOCUMENTS

| | | | |
|---|---|---|---|
| 1,026,971 | 5/1912 | Bullard | 426/594 |
| 2,398,081 | 4/1946 | Carter | 426/594 |
| 2,889,226 | 6/1959 | Hinkley | 426/594 |
| 3,458,319 | 7/1969 | Block | 426/594 |
| 3,492,126 | 1/1970 | Rubenstein | 426/597 |
| 3,869,555 | 3/1975 | Heones | 426/594 |
| 3,892,867 | 7/1975 | Schoonman | 426/594 |
| 4,093,751 | 6/1978 | Ueshima | 426/594 |
| 4,888,194 | 12/1989 | Anderson | 426/580 |

FOREIGN PATENT DOCUMENTS

| | | | |
|---|---|---|---|
| 133772 | 3/1985 | European Pat. Off. | 426/597 |
| 59-95847 | 6/1984 | Japan | 426/594 |
| 264909 | 10/1968 | U.S.S.R. | 426/597 |
| 525447 | 10/1976 | U.S.S.R. | 426/594 |
| 4049 | of 1894 | United Kingdom | 426/594 |

*Primary Examiner*—Carolyn Paden
*Attorney, Agent, or Firm*—Vogt & O'Donnell

[57] ABSTRACT

A beverage composition is provided which contains a beverage vehicle containing milk protein, a beverage base of coffee or tea, kappa carrageenan and buffering and chelating agents including a phosphate and at least one of sodium alginate and propylene glycol alginate. The beverage composition is heat treated for sterilizing it and may be aseptically packaged for a long shelf life at room temperature.

16 Claims, No Drawings

BEVERAGES CONTAINING A BEVERAGE BASE AND MILK PROTEIN

BACKGROUND OF THE INVENTION

The present invention relates to ready-to-serve heat treated protein containing beverages such as cafe au lait, and processes for their preparation.

It has hitherto not been possible to produce an acceptable ready-to-serve cafe au lait (coffee with milk) product involving high temperature processing followed by aseptic packaging owing to the development of poor physical stability defects including creaming, sedimentation and gelatin. In addition, the coffee flavour intensity and quality tend to deteriorate significantly upon storage. These stability problems occur due to the different chemical compositions of coffee and milk which render them detrimental to each other in maintaining consistent physical and flavour shelf stability In cafe au lait these detrimental relationships are further complicated by additives such as buffering agents, hydrocolloid stabilisers and/or emulsifiers.

SUMMARY OF THE INVENTION

We have now devised a ready-to-serve heat treated milk protein containing beverage in which the above physical stability defects can be alleviated and in which the flavour intensity and quality can be improved.

Accordingly, the present invention provides a ready-to-serve heat treated beverage comprising a beverage vehicle containing milk protein, a beverage base containing coffee or tea, a buffering agent, kappa carrageenan in an amount up to 0.010% and a chelating agent for cations in an amount up to 0.25% containing at least 0.005% of sodium alginate and/or propylene glycol alginate, the said amounts being by weight based on the total weight of the beverage.

The present invention also provides a process for preparing the beverage composition by combining the ingredients and then heat-treating the composition. The heat-treated composition then may be packaged aseptically.

DETAILED DESCRIPTION OF THE INVENTION

The beverage composition of the present invention may be coffee with milk (cafe au lait), flavoured cafe au lait, tea with milk, mocha, orange cappuccino, butter rum, amaretto, etc.

The beverage vehicle may be milk or a mixture of milk and water. The milk may be semi skim milk, skim milk or whole milk and preferably has a typical pH value of 6.6 –6.8 especially for a coffee beverage The mixture of milk and water may be, for example, dry milk solids and milk fat recombined with water.

The beverage base may conveniently be in particulate form, for instance instant coffee powder or a blend of coffee powder and cocoa powder e.g., mocha.

The proportions of beverage base and beverage vehicle are generally conventional according to the desired properties of the final product.

If desired, sugar or artificial sweetening agent may be present in the beverage. The amount of sugar or sweetener used is chosen according to the desired flavour and sweetness of the final product.

The kappa carrageenan is a stabiliser which reduces the extent of the physical stability defects such as fat separation or fat creaming, sedimentation and protein gelation. The chelating agent is used for binding cations such as potassium, magnesium and calcium ions which form carrageenan-mineral complexes which tend to gel and cause sediment Examples of suitable chelating agents are phosphates such as disodium phosphate, sodium tripolyphosphate, sodium hexametaphosphate or glass polyphosphate, and metal binding hydrocolloids such as anionic polysaccharides e.g., propylene glycol alginate, sodium alginate, preferably low calcium alginates. The phosphates also act as buffering agents The total amount of chelating agent used is generally from 0.08% to 0.22%, preferably from 0.12% to 0 18% by weight based on the total weight of the beverage product The actual amount of chelating agent used is desirably the amount which reduces the physical stability defects most successfully and may vary depending on the formulation and the coffee source. The amount of propylene glycol alginate or sodium alginate is preferably from 0.01% to 0.04% by weight based on the total weight of the beverage The amount of kappa carrageenan used is preferably from 0.001 to 0.008% and especially from 0.002% to 0.006% by weight based on the total weight of the beverage.

The buffering agent is necessary to protect the proteins from heat coagulation and is conventionally disodium phosphate. In a coffee and milk drink, the buffering agent should be capable of buffering the coffee acids e.g., to a pH ranging from 6.6 to 6.8 thus preventing milk protein aggregation and subsequent precipitation during heat treatment. If the amount of milk is increased, the amount of buffer may be reduced owing to the buffers such as phosphates and citrates indigenous to milk. Generally, the amount of buffer ranges from about 0.10 to 0.25% by weight based on the total weight of the beverage.

Lecithin may advantageously be added to reduce the rate of creaming and improve stability The amount of lecithin used may be up to 0.2% by weight, preferably from 0.05 to 0.1% by weight based on the total weight of the beverage.

Flavouring materials may be added to the beverage, if desired.

The process for the preparation of a ready-to-serve heat-treated beverage composition of the present invention comprises mixing a beverage vehicle containing milk protein, a beverage base containing coffee or tea, a buffering agent, kappa carrageenan in an amount up to 0.010%, and a chelating agent for cations in an amount up to 0.25% containing at least 0.005% of sodium alginate and/or propylene glycol alginate, the said amounts being by weight based on the total weight of the beverage, then heat-treating and homogenising the mixture. The heat treatment of the beverage may be a standard retort sterilisation but is preferably a commercial sterilisation process using aseptic technology, e.g., ultra high temperature (UHT) treatment, preceded or followed by homogenisation.

The UHT treatment may be carried out, for example, at 135° to 150° C. for from 2 to 30 seconds. The duration of the preheat treatment at about 80° C. is not critical and may be from 10 to 90 seconds. The UHT process may be indirect heating using a multi-tubular heat exchanger or plate heat exchanger or direct heating by steam injection or steam infusion.

The beverage may be homogenised before or after the heat treatment, for example, in the pressure range of from 170 to 450 bars, preferably from 200 to 350 bars and especially from 250 to 320 bars. The high pressure during homogenisation reduces creaming and slows milk protein gelation in milk containing beverages. The temperature during the homogenisation may be from 55° C. to 85° C. but advantageously it is from 60° C. to 70° C.

Afterwards, the beverage is a packaged for example in plastics containers, such as TETRAPAK Containers or COMBIBLOCK Containers or in cans or glass bottles and can be successfully stored at room temperatures for extended periods of time e.g. 5-12 months The beverage may be consumed cold or it may be heated for consumption, for instance, in a microwave oven.

EXAMPLES

The following Examples further illustrate the present invention.

Examples 1 to 3

A ready-to-serve cafe au lait was prepared in which the ingredients indicated in Table I were blended in the proportions shown.

TABLE I

| Ingredient | wt. % | | |
|---|---|---|---|
| | Example 1 | Example 2 | Example 3 |
| Pastuerized whole milk | 15.000 | 60.000 | 75.000 |
| Coffee powder | 1.500 | 1.200 | 1.400 |
| Granulated sugar | 6.000 | 4.500 | 3.500 |
| Disodium phosphate dihydrate | 0.088 | 0.170 | 0.120 |
| Monosodium phosphate monohydrate | 0.053 | — | — |
| Kappa-carrageenan | 0.003 | 0.005 | 0.005 |
| Sodium alginate | 0.030 | 0.030 | 0.015 |
| Water | 77.326 | 34.095 | 19.960 |
| | 100.000 | 100.000 | 100.000 |

20 parts of water at 55°C. were metered into a liquefier tank. The kappa carregeenan and sodium alginate were blended well with 0.5 parts of sugar in a plastic bag. The preblend was added slowly to the water in the liquifier over a period of 40 seconds, an additional 5 seconds was allowed for liquefying, and then the mixture was agitated for 5 minutes for equilibration. The remaining water was added cold together with the milk (pH 6.65) and allowed to mix for 5 minutes. The remaining sugar was added with the liqueifier on for a few seconds. The phosphates were predissolved in 0.5 parts hot water and added with agitation using a lightning mixer.

The mix was transferred to a batch tank and the coffee powder was added first with high speed agitation during coffee powder dissolution and then with low speed agitation to avoid foaming The mix was then processed in a plate heat exchanger with a preheat treatment at 80° C. for 60 seconds followed by steam injection at 141° C. and held for 14 seconds. After flashing at 80° C., the mix was homogenised in double stages at 250/50 bars at 63° C. and cooled before being aseptically filled into plastic cartons (Tetrapak).

The shelf life at room temperature was at least 6 to 12 months.

We claim:

1. A ready-to-serve heat treated beverage comprising a sterilized mixture of a beverage vehicle containing mild protein, a beverage base selected from a group consisting of a beverage base containing coffee and a beverage base containing tea, kappa carrageenan in the amount of up to 0.010% by weight, and buffering and chelating agents for, respectively, buffering acids for protecting mild proteins from heat coagulation and binding cations which form kappa carrageenan-mineral complexes, in an amount up to 0.25% by weight, comprised of a phosphate and at least 0.005% by weight of at least one alginate selected from a group of alginates consisting of sodium alginate and propylene gylcol alginate, each weight being based upon a total weight of the beverage composition.

2. A beverage composition according to claim 1 wherein the beverage vehicle is selected from a group of beverage vehicles consisting of milk and mixture of dry milk solids combined with water.

3. A beverage composition according to claim 1 wherein the beverage vehicle has a pH above 6.63.

4. A beverage composition according to claim 1 further comprising a sweetner selected from a group of sweeteners consisting of sugar and artificial sweetners.

5. A beverage composition according to claim 1 wherein the amount of kappa carrageenan is from 0.001% to 0.008% by weight.

6. A beverage composition according to claim 1 wherein the amounts of the buffering and chalating agents is from 0.08% to 0.22% by weight.

7. A beverage composition according to claim 1 or 2 or 21 wherein the amount of the alginate is from 0.01% to 0.04% by weight.

8. A beverage composition according to claim 1 wherein the phosphate is disodium phosphate.

9. A beverage composition according to claim 1 or 8 wherein the amount of phosphate is from 0.10% to 0.25% by weight.

10. A beverage composition according to claim 1 further comprising lecithin in an amount up to 0.2% by weight based on the total weight of the beverage composition.

11. A process for the preparation of a ready-to-serve heat treated beverage comprising:

mixing a beverage vehicle containing mild protein, a beverage base selected from a group consisting of a beverage base kappa carrageenan in an amount up to 0.010% by weight, and buffering and chelating agents for, respectively, buffering acids for protecting mild proteins from heat coagulation and binding cations which form kappa carrageenan-mineral complexes, in an amount up to 0.005% by weight of at least one alginate selected from a group of alginates consisting of sodium alginate and propylene glycol alginate, each weight being based upon a total weight of the beverage composition mixture;

homogenizing the mixture; and heat-treating the homogenized mixture.

12. A process for the preparation of a ready-to-serve heat treated beverage comprising:

mixing beverage vehicle containing milk protein, a beverage base selected from a group consisting of a beverage base containing coffee and a beverage base containing tea, kappa carrageenan in an amount up to 0.010% by weight, and buffering and chelating agents for, respectively, buffering acids for protecting milk proteins from heat coagulation and binding cations which form kappa carrageenan-mineral complexes, in an amount up to 0.25% by weight, comprised of a phosphate and at least 0.005% by weight of at least one alginate selected from a group of alginates consisting of sodium alginate and propylene glycol alginate, each weight being based upon a total weight of the beverage composition mixture;

heat treating the mixture; and homogenizing the heat treated mixture.

13. A process according to claim 11 or 12 wherein the heat treatment is an ultra high temperature processing treatment.

14. A process according to claim 13 wherein the ultra high temperature processing treatment is carried out at a 135° C. to 150° C. for a period of from 2 seconds to 30 seconds.

15. A process according to claim 11 or 12 wherein the homogenization is carried out at a pressure in the range of from 250 to 320 bars at a temperature from 60° C. to 70° C.

16. A process according to claim 14 wherein the homogenization is carried out at a pressure in the range of from 250 to 320 bars at a temperature from 60° C. to 70° C.

* * * * *

UNITED STATES PATENT AND TRADEMARK OFFICE
CERTIFICATE OF CORRECTION

PATENT NO. : 4,980,182
DATED : December 25, 1990
INVENTOR(S) : Steven S. KWON, et al.

It is certified that error appears in the above-identified patent and that said Letters Patent is hereby corrected as shown below:

Column 3, line 67 [line 3 of claim 1], "mild" should be --milk--.

Column 4, line 1 [line 5 of claim 1], "the" should be --an--.

Column 4, line 4 [line 8 of claim 1], "mild should be --milk--.

Column 4, line 14 [line 3 of claim 2], after "and", insert --a--.

Column 4, line 28 [line 2 of claim 7], "21" should be --6--.

UNITED STATES PATENT AND TRADEMARK OFFICE
CERTIFICATE OF CORRECTION

PATENT NO.  : 4,980,182
DATED       : December 25, 1990
INVENTOR(S) : Steven S. KWON, et al.

It is certified that error appears in the above-identified patent and that said Letters Patent is hereby corrected as shown below:

Column 4, line 41 [line 3 of claim 11], "mild" should be --milk--.

Column 4, line 43 [line 5 of claim 11], after "base", insert --containing coffee and a beverage base containing tea,--.

Column 4, line 46 [line 8 of claim 11], "mild" should be --milk--.

Column 4, line 48 [line 10 of claim 11], after "to" insert --0.25% by weight, comprised of a phosphate and at least--.

UNITED STATES PATENT AND TRADEMARK OFFICE
CERTIFICATE OF CORRECTION

PATENT NO. : 4,980,182

DATED : December 25, 1990

INVENTOR(S) : Steven S. KWON, et al.

It is certified that error appears in the above-identified patent and that said Letters Patent is hereby corrected as shown below:

Column 4, line 58 [line 3 of claim 12], after "mixing", insert --a--.

Signed and Sealed this

Twenty-eighth Day of April, 1992

Attest:

HARRY F. MANBECK, JR.

*Attesting Officer*  *Commissioner of Patents and Trademarks*